United States Patent
Burns

(10) Patent No.: US 7,231,524 B2
(45) Date of Patent: *Jun. 12, 2007

(54) METHOD FOR WATERMARKING COMPUTER PROGRAMS

(75) Inventor: Gregory Burns, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/276,176

(22) Filed: Feb. 16, 2006

(65) Prior Publication Data

US 2006/0123237 A1 Jun. 8, 2006

Related U.S. Application Data

(63) Continuation of application No. 10/994,842, filed on Nov. 22, 2004, now Pat. No. 7,058,813, which is a continuation of application No. 09/320,549, filed on May 27, 1999, now Pat. No. 6,834,343.

(51) Int. Cl.
*H04L 9/00* (2006.01)
*G06K 9/00* (2006.01)

(52) U.S. Cl. .............................. 713/176; 382/100

(58) Field of Classification Search ............... 713/168, 713/176, 189–190; 726/26, 30, 32; 380/54, 380/200–202; 382/100; 705/50, 57–59
See application file for complete search history.

(56) References Cited

U.S. PATENT DOCUMENTS

| 5,644,682 | A | | 7/1997 | Weinberger |
| 5,646,997 | A | | 7/1997 | Barton |
| 5,745,569 | A | * | 4/1998 | Moskowitz et al. .......... 705/58 |
| 6,065,046 | A | | 5/2000 | Feinberg |
| 6,067,582 | A | | 5/2000 | Smith |
| 6,141,753 | A | * | 10/2000 | Zhao et al. ................. 713/176 |
| 6,425,081 | B1 | | 7/2002 | Iwamura |

* cited by examiner

*Primary Examiner*—Hosuk Song
(74) *Attorney, Agent, or Firm*—Banner & Witcoff, Ltd.

(57) ABSTRACT

A method for encoding watermark information into a computer application in which occurrences of at least two non-interfering computer-executable code instructions contained in a block of code of a computer application are determined. A relative order of the non-interfering computer-executable code instructions is exchangeable without adversely affecting an overall execution of the computer application. Watermark information is generated based on personal identification of a purchaser of the computer application. The relative order of an occurrence of the non-interfering computer-executable code instructions is exchanged based on watermark information. Lastly, the computer application is transmitted over a computer network.

20 Claims, 4 Drawing Sheets

METHOD FOR WATERMARKING COMPUTER PROGRAMS

This application is a continuation of application Ser. No. 10/994,842, filed on Nov. 22, 2004 Now U.S. Pat. No. 7,058,813 which is a continuation of application Ser. No. 09/320,549 filed May 27, 1999 (now U.S. Pat. No. 6,834,343). The entire disclosures of both of these applications are hereby incorporated herein by reference.

FIELD OF THE INVENTION

The present invention relates to the field of digitally watermarking a computer program. More particularly, the present invention relates to a method for encoding digital watermark information into a program or application downloaded over a computer network, such as the Internet.

BACKGROUND OF THE INVENTION

Computer networking technology has advanced to the point that distribution of computer programs and applications over a computer network, such as the Internet, has become commercially attractive because the infrastructure and expenses associated with a sales and distribution network are eliminated. Nevertheless, such an approach has a drawback in that software is easily pirated, thereby potentially minimizing any revenue obtained.

What is needed is an easy and efficient technique for encoding information, termed a "digital watermark" or more simply a "watermark", into a computer program or application that is being downloaded over a computer network so that any pirating of the downloaded software can be traced to the original purchaser. Moreover, what is needed is a way to encode a digital watermark into a computer program in such a way that the information is not easily detected and forged.

SUMMARY OF THE INVENTION

The present invention provides a technique for encoding digital watermark information into a computer program, or application that is downloaded from a computer network, such as the Internet, so that every instance of an application is unique. When the application is distributed or sold over the Internet, personal identification information, such as a purchaser's name, address, telephone number, credit card number, etc., is collected and encoded into a binary sequence. The binary sequence is mapped into an instruction swap table to create a sequence that is used for exchanging, or swapping, specific occurrences of pairs of non-interfering instructions. As the application is downloaded, pairs of non-interfering instructions are easily and efficiently swapped based on the encoded binary sequence. Thus, the downloaded application is watermarked with the personal identification information collected from the purchaser before the application was downloaded.

Two downloaded watermarked applications can be compared by a pirate, but only the differences between the two applications will be detected and not all of the pairs of instructions that can be swapped or that have been changed will be detected. Consequently, a large number of downloaded applications must be compared before all non-interfering pairs of instructions can be reliably determined. To make the watermark information more difficult to detect and forge, the encoded binary sequence can also be encrypted using various techniques, such as a public-key encryption technique, before pairs of non-interfering instructions are swapped.

To detect the origin of a pirated application, the watermark information is extracted from the pirated application by comparison to the original code of the application. The resulting difference is decrypted and converted to the encoded binary sequence forming the watermark information. The resulting watermark information is decoded to determine the personalized identification information of the original purchaser.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Although not required, the invention will be described in the general context of computer-executable instructions, such as program modules, that are executed by a personal computer or a server. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCS, mini-computers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
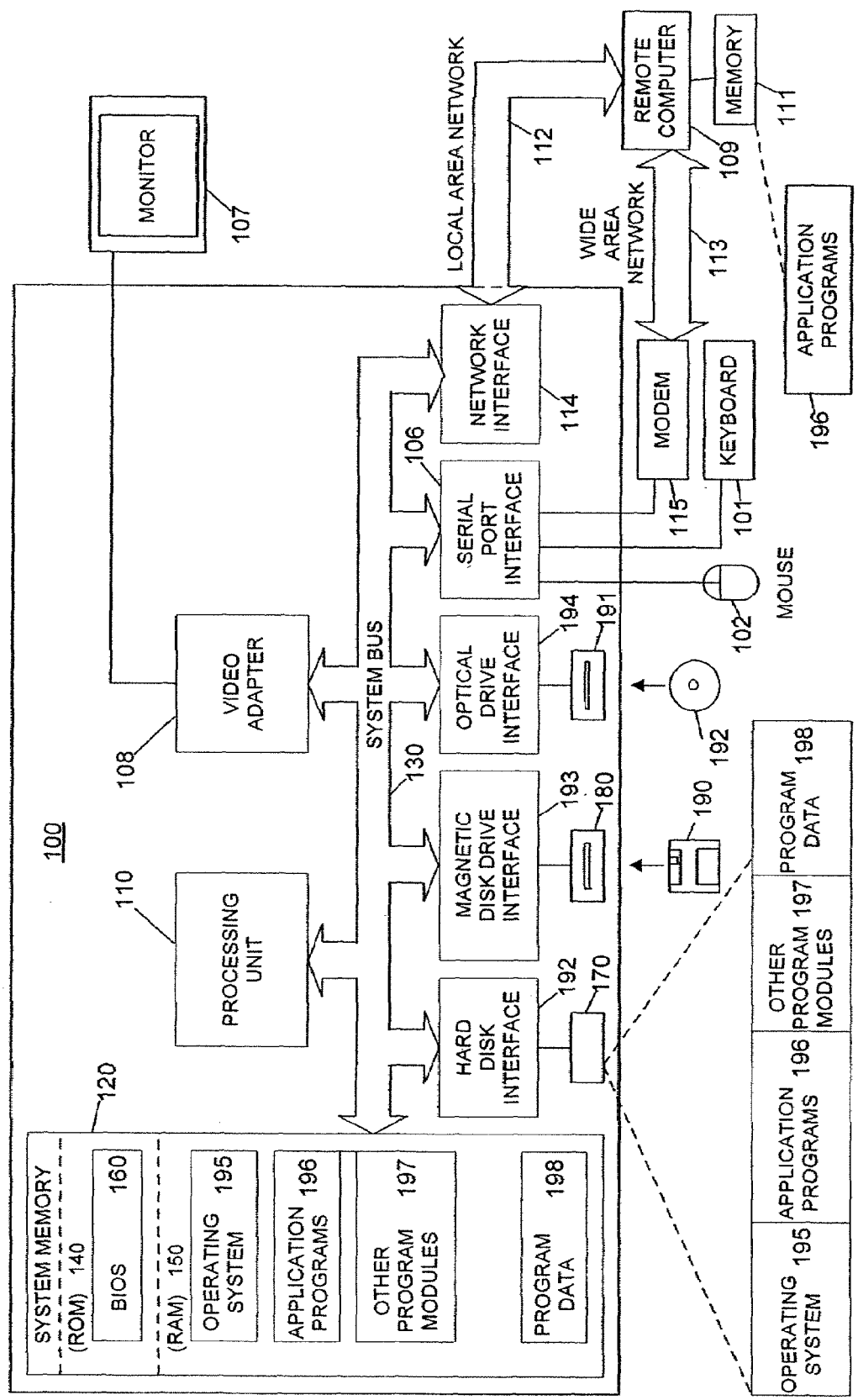
FIG. 1 is a schematic diagram of a conventional general-purpose digital computing environment that can be used to implement various aspects of the invention.

FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other ways of establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

A primary aspect of the invention provides a method for encoding watermark information into a program, or application that is downloaded from a computer network, such as the Internet, so that every instance of an application is in some way unique. According to the invention, a sequence of two or more non-interfering instructions in a basic block of executable code of a program can be exchanged in a controlled manner to watermark the program with specific identity information. The present invention will be described with reference to FIGS. 2-6.

Referring to FIG. 1, remote computer 109 in the computing environment of FIG. 1 is a server that stores a computer program or application for sale and distribution over WAN 113, which is preferably the Internet. A computer program, or application, as used herein means any set of computer-executable machine code instructions, script such as VBScript or JavaScript, or any system of byte codes that execute within a virtual machine environment. For simplification in describing the present invention, the phrase computer-executable code instructions, or instructions for short, as used herein, includes computer-executable machine code instructions, script and any system of byte codes that execute within a virtual machine environment. When an application is sold over the Internet, personal identification information, such as a purchaser's name, address, telephone number, credit card number, etc., is collected by server 109 and encoded into a binary sequence. Personal identification information, as used herein, can be personal to an individual or to another entity, such as a corporation or an organization. The binary sequence is then mapped into a swap table to create a sequence that is used for exchanging, or swapping, specific occurrences of pairs of non-interfering computer-executable instructions.

As used herein, non-interfering means, in the case of machine code, instructions that the operands of the second instruction do not depend on the results of the first instruction such that the two instructions can be swapped without changing in any way the result of executing the two instructions. In the case of script commands, non-interfering means script commands that can be exchanged without changing the function or behavior of the script. In the case of byte code sequences, non-interfering means a virtual machine can execute short byte-code sequences in either order with the same result in each case. Also as used herein, the phrase non-interfering instructions means non-interfering computer-executable machine code instructions, non-interfering scripts and non-interfering byte codes sequences.

As the application is transmitted by server 109 for downloading by the purchaser, pairs of non-interfering instructions of the application are easily and efficiently swapped according to the encoded binary sequence. As a result, the downloaded application is watermarked with the personalized information collected from the purchaser before the application was downloaded. That is, the personalized information collected from the purchaser is encoded in the specific way the pairs of non-interfering instructions have been swapped or not as the case may be.

Figure 2:
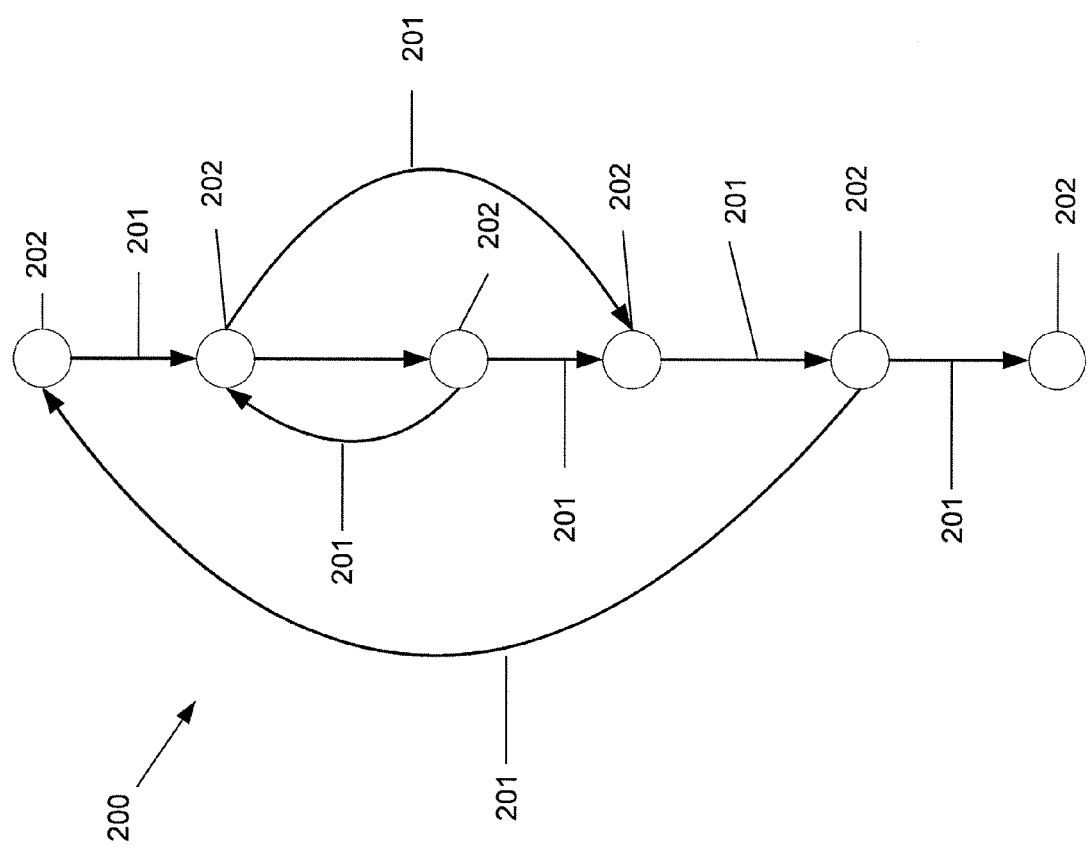
FIG. 2 shows a block diagram representing an exemplary sequence of programming code of a program or application.

FIG. 2 shows a block diagram representing an exemplary sequence of programming code 200 of a program or application. The diagram is similar to a flow chart, but is abstracted to hide irrelevant detail so that only the control flow is described. Code sequence 200 includes basic blocks of code 201, represented by arcs and lines with arrow heads attached, and nodes 202, represented by circles. The arrow heads show the direction of the control flow. A basic block of code, as used herein, is a sequence of computer-executable instructions having the characteristic that if the first instruction of the sequence is executed, the last instruction of the sequence, and all instructions between the two instructions are always executed. By definition, there are no branches into or out of a basic block. The diagram thus expresses the full variability of the control flow of the code.

A node, as used herein, is a fork or join point in the programming code sequence. A fork, defined as a node having two or more arrows leaving the node, is always associated with a conditional branch instruction. The next executed instruction depends on the outcome of executing the branch instruction which in turn depends on the state or value or some register or memory location. A join, defined as a node having two or more arrows entering the node, is always the destination of a branch instruction elsewhere in the code. A node can represent both a fork and a join in the control flow of the code.

Algorithms for processing computer-executable instruction sequences to locate and identify the basic blocks are well understood and are used extensively by compilers, code generators and optimizers.

According to the invention, specific occurrences of two non-interfering instructions contained in the same basic block of code of a program or application are recorded in a swap table created for the application. An example of two non-interfering machine instructions contained in a basic block of machine code is two register load instructions that load different registers. The executable sequence of the two register load instructions can be switched, or swapped, without adversely affecting the overall execution of the application.

Figures 3, 4:
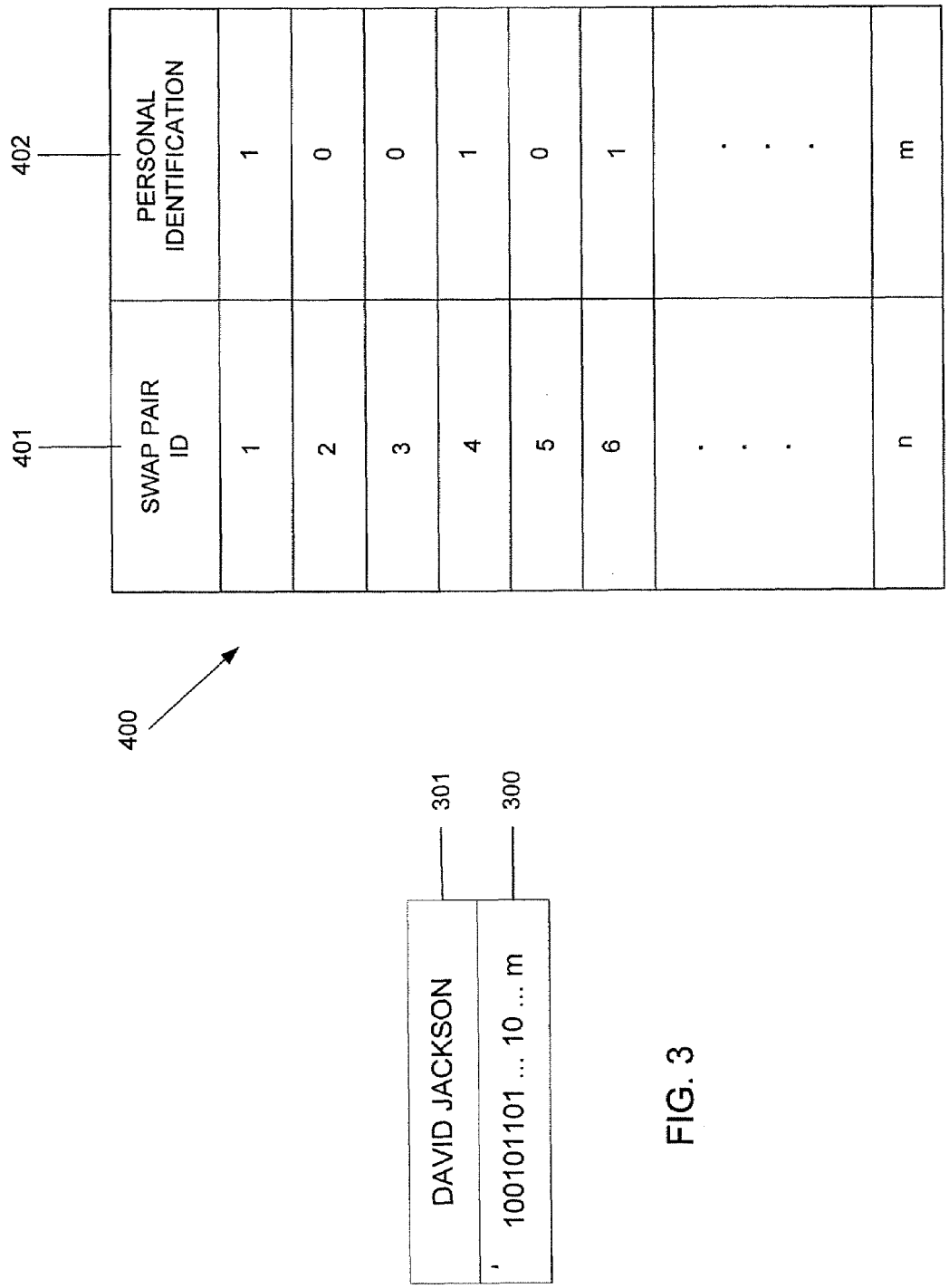
FIG. 3 shows an exemplary binary sequence encoded from personal identification information according to the present invention.
FIG. 4 shows an exemplary arrangement of a swap table according to the present invention.

An exemplary binary sequence 300 formed from personal identification information 301 is shown in FIG. 3. Personal identification information can include information relating to, for example, an identity of the purchaser, such as a purchaser's name or public key certificate; an address of the purchaser, such as a residential address, a mailing address, a zip code, and/or a telephone number; an e-mail address, and/or financial account information of the purchaser, such as a credit card account and/or a bank account, and other information including, but not limited to the date and time of the purchase, and the identity, host name, or network address of the computer from which the purchase request originated. While the term purchaser is being used herein to describe the present invention, the term purchaser should be understood to include any user, whether an individual or business entity, that is registered to use or has permission to use a computer application that is being watermarked according to the present invention.

Binary sequence 300 can be encoded using any well-known encoding technique, such as a binary sequence for a simple ASCII or Unicode character string. Binary sequence 300 can also be encrypted and/or scrambled to obscure personal identification information 301. For example, the collected personal information can be mapped into a binary sequence of m bits in length. The m-bit binary sequence can then be encrypted using a well-known public key encryption technique and/or scrambled according to a private algorithm. Of course, binary sequence 300 need not be encrypted and/or scrambled.

FIG. 4 shows an exemplary arrangement of a swap table 400 according to the present invention. Swap table 400 includes a swap pair identification column 401 and a personal information column 402. Pairs of non-interfering instructions are identified, or indexed, in field 401. Binary sequence 300 is mapped into swap table 400 in column 402, thereby creating a swap sequence that is used for swapping specific occurrences of pairs of non-interfering instructions. For example, an occurrence of a "1" in the swap sequence indicates that the non-interfering instructions of the corresponding swap pair is swapped. Accordingly, an occurrence of a "0" in the swap sequence indicates that the corresponding swap pair is not swapped.

In exemplary swap table 400, swap pair identification column 401 has a total of n swap pairs, while the swap sequence (sequence 300 in FIG. 3) that is mapped into table 400 has a total of m bits, with m being equal to n. Such a situation is not required by the present invention. For example, there can be fewer bits m in swap sequence 301 than swap pairs n. In such a situation, the swap sequence is preferably padded out to length m with a random generated sequence of ones and zeroes. When swap sequence 301 has a greater number of bits m than swap pairs n, selected bits of swap sequence 301 can be omitted or swap sequence 301 can be truncated when mapped into swap table 400.

As the application is downloaded, pairs of non-interfering instructions are easily and efficiently swapped according to the swap sequence. As a result, the downloaded application is digitally watermarked with the personalized information collected from the purchaser before the application is downloaded. Accordingly, the personalized information collected from the purchaser is encoded into the downloaded application in the specific way the pairs of non-interfering instructions have been swapped.

Figure 5:
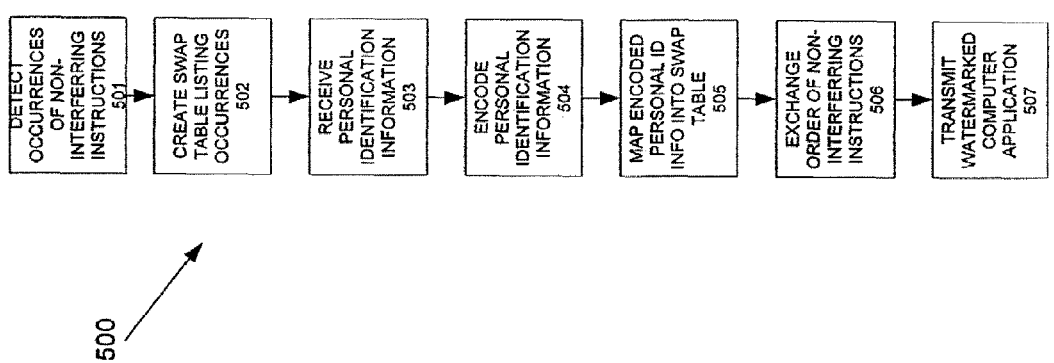
FIG. 5 shows a flow diagram for encoding a computer application with watermark information according to the present invention.

FIG. 5 shows a flow diagram 500 for encoding a computer application with watermark information according to the present invention. At step 501, occurrences of non-interfering instructions contained in the same basic block of code of a computer application are detected. The first phase of this step is to identify the basic blocks in the code sequence and then to identify the non-interfering instruction pairs within each basic block. At step 502, a swap table is created listing the occurrences. At step 503, personal identification information is received by, for example, a purchaser of the computer application responding to an interactive query. According to the invention, personal identification information can be personal to an individual or to another entity, such as a corporation or an organization. At step 504, the received personal identification information is encoded using any well-known encoding technique, and can optionally be encrypted and/or scrambled to obscure personal identification information.

At step 505, the encoded personal identification information is mapped into the swap table created in step 502. Just prior to the application being transmitted to the purchaser over a computer network, the relative order of non-interfering instructions are exchanged at step 506 based on the mapping of the personal identification information into the swap table. At step 507, the watermark-encoded computer application transmitted to the purchaser over a computer network, such as the Internet. Alternatively, steps 506 and 507 can be done simultaneously.

It is only necessary to perform steps 501 and 502 once to compute the swap table, and the resultant swap table can used to encode the watermark for all success application downloads. This is an important optimization because construction of the swap table, steps 501 and 502, is much more computationally intensive than making the instruction exchanges in the application, steps 503-507.

A watermark, as described herein according to the invention, serves two purposes, it incorporates personal and other information in a unique version of a downloaded application, and it makes it difficult to create a version of the application that contains a counterfeit watermark without prior knowledge of the original application. For example, two downloaded applications that have been watermarked according to the present invention can be compared, but only the differences between the two applications will be detected and not all of the pairs of instructions that can be swapped or that have been changed will be detected by the comparison. Consequently, a pirate would need to compare a large sample of downloaded applications before reliably determining all non-interfering pairs of instructions. To make the watermark information even more difficult to detect and forge, the binary sequence can also be encrypted, as mentioned, using various techniques, such as a public-key encryption technique, before the pairs of instructions are swapped.

To detect the origin of a pirated application that has been watermarked according to the present invention, the watermark information is extracted from the pirated application by comparison to the original code of the application. The resulting difference is decrypted, if necessary, and converted to the original binary sequence forming the watermark information. The resulting watermark information is decoded to determine the originally-encoded purchaser information. The binary sequence can also be digitally signed such that an application containing a modified watermark can be easily identified as counterfeit by checking the digital signature.

Figure 6:
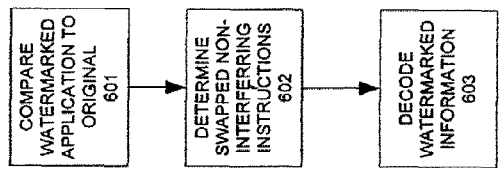
FIG. 6 shows a flow diagram for detecting watermark information that has been encoded into a computer application according to the present invention.

FIG. 6 shows a flow diagram 600 for detecting watermark information that has been encoded into a computer application according to the present invention. At step 601, a watermarked copy of a computer application is compared to an original, or non-watermarked, version of the application. At step 602, swapped non-interfering instructions are determined based on the comparison of step 601. At step 603, the detected watermark information is decoded based on a swap table for the computer application and by decoding and/or decrypting the personal identification information.

Watermarking according to the present invention is also applicable to a dynamic link library (DLL). When a DLL is watermarked, a swap table for the application is created with each entry in the table corresponding to a specific occurrence of two non-interfering instructions within each basic block of the DLL.

Further, watermarking can be based on the relative order of three or more non-interfering instructions. Specific occurrences of more than two non-interfering instructions contained in the same basic block of code of a program or application can be recorded in a swap table for an application in the same manner as described above for two non-interfering instructions. In such a situation, the mapping of the watermark information can include a specific relative order of the three or more non-interfering instructions.

While the present invention has been described in connection with the illustrated embodiments, it will be appreciated and understood that modifications may be made without departing from the true spirit and scope of the invention.

I claim:

1. A method for encoding watermark information into a computer application comprising:
   (a) determining occurrences of at least two non-interfering computer-executable code instructions contained in the computer application; and
   (b) exchanging a relative order of an occurrence of the non-interfering computer-executable code instructions based on watermark information.

2. The method of claim 1, wherein (a) further comprises creating a swap table listing the determined occurrences of non-interfering computer-executable code instructions.

3. The method of claim 2, wherein (a) further comprises indexing the at least two non-interfering computer-executable code instructions.

4. The method of claim 2, wherein (b) further comprises mapping the watermark information into the swap table.

5. The method of claim 1, wherein the non-interfering computer-executable code instructions are non-interfering scripts.

6. The method of claim 1, wherein the non-interfering computer-executable code instructions are non-interfering byte code sequences.

7. The method of claim 4, wherein the watermark information includes personal identification information of a purchaser of the computer application.

8. The method of claim 7, wherein the personal identification information includes at least one of an identity of the purchaser, address information of the purchaser, and financial account information of the purchaser.

9. The method of claim 7, wherein the identity of the purchaser includes one of a name of the purchaser and a public key certificate of the purchaser.

10. The method of claim 8, wherein the address information of the purchaser includes one of a residential address, a mailing address, an e-mail address, a zip code, and a telephone number.

11. The method of claim 8, wherein the financial account information of the purchaser includes one of a credit card account and a bank account.

12. A method for detecting watermark information encoded in a computer application comprising:
   (a) determining occurrences of exchanged non-interfering computer-executable code instructions contained in a computer application; and
   (b) determining watermark information based on the determined occurrences of exchanged non-interfering computer-executable code instructions contained in the computer application.

13. The method of claim 12, wherein (b) further comprises searching a swap table for the determined non-interfering computer-executable code instructions.

14. The method of claim 12, wherein the watermark information includes personal identification information of a purchaser.

15. The method of claim 14, wherein the personal identification information includes at least one of an identity of the purchaser, address information of the purchaser, and financial account information of the purchaser.

16. The method of claim 15, wherein the address information of the purchaser includes one of a residential address, a mailing address, an e-mail address, a zip code, and a telephone number.

17. The method of claim 15, wherein the financial account information of the purchaser includes one of a credit card account and a bank account.

18. A method of detecting watermark information encoded in a computer application, the method comprising:
   (a) comparing a first computer application to a watermarked copy of a second computer application;

(b) determining swapped non-interfering instructions based on the comparison of the first computer application to the watermarked copy of the second computer application;
(c) searching a swap table for the determined non-interfering instructions; and
(d) determining watermark information based on entries of the non-interfering instructions in the swap table.

19. The method of claim 18, wherein the non-interfering computer-executable code instructions are non-interfering scripts.

20. The method of claim 18, wherein the non-interfering computer-executable code instructions are non-interfering byte code sequences.

* * * * *